(No Model.)

J. C. STURGES.
HARROW.

No. 603,798. Patented May 10, 1898.

Witnesses
Harry W. Hahn
Victor J. Evans

Inventor
Joseph Carol Sturges
by John Wedderburn
Attorney

UNITED STATES PATENT OFFICE.

JOSEPH CAROL STURGES, OF AURORA, ILLINOIS.

HARROW.

SPECIFICATION forming part of Letters Patent No. 603,798, dated May 10, 1898.

Application filed September 20, 1897. Serial No. 652,377. (No model.)

*To all whom it may concern:*

Be it known that I, JOSEPH CAROL STURGES, residing at Aurora, in the county of Kane and State of Illinois, have invented certain new and useful Improvements in Harrows; and I do hereby declare the following to be a full, clear, and exact description of the invention, such as will enable others skilled in the art to which it appertains to make and use the same.

This invention relates to a novel rotary harrow; and its object is to provide a suitable harrow-frame with a rotary tooth-carrying element designed to have an irregular rotary motion when drawn over the ground for the purpose of thoroughly harrowing the same or to be adjustably secured to the frame in a manner which will present the several series of teeth in the most effective relation.

To the accomplishment of this object and others subordinate thereto my invention consists in providing a preferably metallic harrow-frame with a rotary tooth-carrier or harrow proper carried by an axial spindle journaled in the frame and designed to rotate against antifriction-rollers and slides mounted upon the frame in a manner to permit the rotation of the harrow or rotary element with the least possible friction, and suitable adjusting mechanism being provided for the purpose of securing the rotary element to the frame in any desired position.

Figure 1:
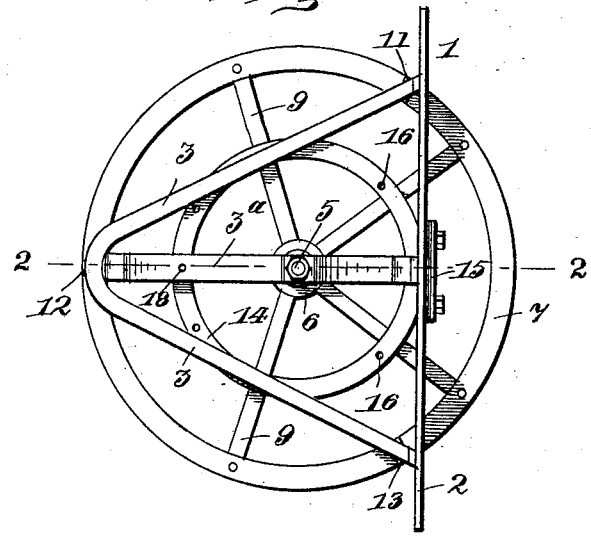
Figure 2:
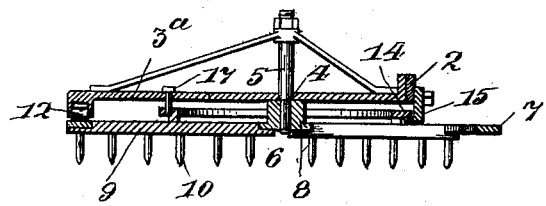
Figure 3:
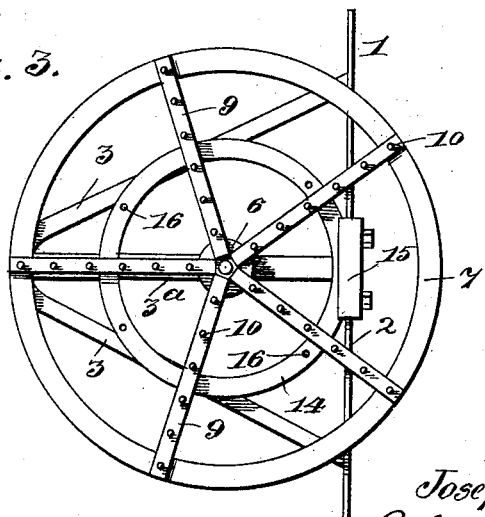

Referring to the drawings, Figure 1 is a top plan view of my harrow complete. Fig. 2 is a central vertical section on the line 2 2 of Fig. 1, and Fig. 3 is a bottom plan view of the same.

Referring to the numerals on the drawings, 1 indicates the frame of my device, which is preferably composed of a draft-bar 2 and rearwardly-converging side bars 3, secured at their forward extremities to the draft-bar in any suitable manner and preferably formed by bending a suitable metallic rod at its center in a manner to impart to it a substantially U shape.

3ª indicates the central frame-bar, secured at its opposite ends to the rear side of the draft-bar at about its center and at its opposite side to the rear extremities of the side bars 3 and provided with a bearing-aperture 4, designed to receive the stud 5, projecting upwardly from a rotary tooth-carrier 6, composed of a circular rim 7, a hub 8, and intermediate radiating tooth-bars 9, provided upon their under sides with harrow-teeth 10, secured thereto in any suitable manner.

11, 12, and 13 indicate antifriction-rollers journaled in suitable bearings upon the under side of the frame at its rear extremity and adjacent to the forward ends of the side bars 3, and against which the rim of the harrow is designed to rotate. It will be observed, however, that provision must be made for preventing the frame of the harrow from riding up and becoming separated from the rotary tooth-carrier, and in order to provide against this contingency and to afford a more efficient bearing I provide a circular track 14, concentric with the rotary element and mounted upon the tooth-bars in a manner to leave a slight space between the said track and the upper surfaces of said bars in order to permit the track to rest upon a suitable slide 15, carried at the center of the draft-bar 1, it being observed that when the parts are rotated relatively the slide will pass between the track and the tooth-bars and will serve to support the former.

Suitable provision is made for attaching the draft appliance to the draft-bar—as, for instance, the apertures adjacent to the opposite ends of said draft-bar, designed to receive the rear ends of the draft-chains. (Not illustrated.) In use the harrow is drawn over the ground in the usual manner, and the rotary tooth-carrier will oscillate or rotate according to the unequal resistance afforded its movement, or rather the unequal distribution of the resistance upon the opposite sides of its pivotal point presented by the obstructions with which the teeth are brought in contact, and it will be observed that by this means the ground will be more effectually loosened than is possible with the ordinary rigid harrow-frames, which force the teeth to follow a predetermined course and therefore only loosen the ground in rows or furrows. It may be desirable, however, in some instances to secure the tooth-carrier or harrow proper to the frame, and in order that this may be done in a manner to present the series of teeth carried by the tooth-bars in any desired relation I provide a series of apertures 16 through the track 14 and designed to receive a securing-pin 17, which when in use passes through one of said apertures and through a registering aperture 18 in the slide.

While the construction of my invention as illustrated and described appears at this time to be preferable, I do not desire to limit myself to such structural details, but reserve the right to change, modify, or vary them at will within the scope of my invention.

Having thus described my invention, what I claim as new, and desire to secure by Letters Patent, is—

In a harrow the combination with a triangular frame provided with a central frame-bar, a circular tooth-frame provided with a hub and with radiating tooth-carrying arms and a concentric circular track provided with a series of apertures, a stud carried by the rotary tooth-frame and extending through the central frame-bar, and antifriction-rollers intermediate of the relatively-movable parts and means for securing them in their adjustable position, substantially as specified.

In testimony whereof I have signed this specification in the presence of two subscribing witnesses.

JOSEPH CAROL STURGES.

Witnesses:
M. D. YAGER,
W. WARKEN.